United States Patent [19]

Kim

[11] Patent Number: 5,206,728
[45] Date of Patent: Apr. 27, 1993

[54] TELEVISION SYSTEM HAVING AN ULTRABLACK VIDEO SIGNAL BLANKING LEVEL FOR AN ON-SCREEN CHARACTER DISPLAY

[75] Inventor: Yong H. Kim, Singapore, Singapore

[73] Assignee: Thomson Consumer Electronics, S.A., Courbevoie, France

[21] Appl. No.: 696,489

[22] Filed: May 6, 1991

[30] Foreign Application Priority Data

May 3, 1991 [GB] United Kingdom ............... 9109613

[51] Int. Cl.⁵ ............................................. H04N 5/14
[52] U.S. Cl. .................................. 358/168; 358/183; 358/22; 358/165
[58] Field of Search ............... 358/171, 168, 183, 22, 358/181, 165; 340/730, 748, 734

[56] References Cited

U.S. PATENT DOCUMENTS

| 3,602,646 | 8/1971 | Goldberg | 358/183 |
|---|---|---|---|
| 4,197,557 | 4/1980 | Tuma et al. | 358/34 |
| 4,218,698 | 8/1980 | Bart et al. | 358/183 |
| 4,405,946 | 9/1983 | Knight | 358/183 |
| 4,760,391 | 7/1988 | Gries | 340/748 |

FOREIGN PATENT DOCUMENTS

| 0266978 | 11/1988 | Japan. | |
|---|---|---|---|
| 0287178 | 11/1988 | Japan. | |
| 0209081 | 8/1990 | Japan. | |
| 2038136 | 7/1980 | United Kingdom | 358/183 |

OTHER PUBLICATIONS

Data Sheet for M52041SP.

*Primary Examiner*—James J. Groody
*Assistant Examiner*—David E. Harvey
*Attorney, Agent, or Firm*—Joseph S. Tripoli; Peter M. Emanuel

[57] ABSTRACT

An arrangement for displaying characters and/or graphics on the screen of a television system including a brightness control section for controlling the black level of video images includes a character blanking section for blanking behind the video image so as to make the characters and/or graphics more visible. The character blanking section is coupled to the brightness control section for generating an "ultra-black" character blanking level which tracks, but is slightly greater (in the black direction) than the black level for the video image.

6 Claims, 5 Drawing Sheets

TELEVISION SYSTEM HAVING AN ULTRABLACK VIDEO SIGNAL BLANKING LEVEL FOR AN ON-SCREEN CHARACTER DISPLAY

FIELD OF THE INVENTION

The present invention concerns an on-screen character display arrangement for a television system and particularly one with provisions for controlling the background of the displayed characters.

BACKGROUND OF THE INVENTION

Television systems often include a so called on-screen display (OSD) arrangement for displaying alphanumeric and other characters and graphics in order to indicate status and instruction information. In a television receiver, the OSD arrangement may be used to indicate the selected channel, the time of day and information such as the volume, brightness and contrast levels. Typically, for this type of information, the characters and graphics are displayed within within the image produced in response to to the normal video signal. Usually, the video information at the location of ("behind") the characters or graphics is suppressed ("blanked") so as to more clearly distinguish the characters or graphics from the viceo image and therefore more visible. This is usually accomplished by causing the video signal to assume a blanking level beyond the image black level during the times when the characters and graphics are to be displayed. However, in some television systems setting the character blanking level too high has been found to cause the proper operation of the television systems to be disturbed.

SUMMARY OF THE INVENTION

The above-described problem can be avoided if the character blanking level is caused to track the black level of the image. The black level of the image is related to the brightness of the image and is usually made adjustable to allow for video image brightness adjustments. The inventor has recognized that the adjustment of brightness to make a brighter video image may influence the appearance of characters and graphics since it effectively shifts the level of the image behind the characters and graphics toward white and away from black. Accordingly, an aspect of the invention concerns circuitry for providing an "ultra-black" character blanking level which tracks the adjustable black level, but which is sightly greater ("more black") than the image black level.

These and other aspects of the invention will be described in detail with reference to the accompanying Drawing.

BRIEF DESCRIPTION OF THE DRAWING

In the accompanying Drawing.

In various Figures, the same or similar elements are identified by the same reference numbers.

DETAILED DESCRIPTION OF THE DRAWING

Figure 1:
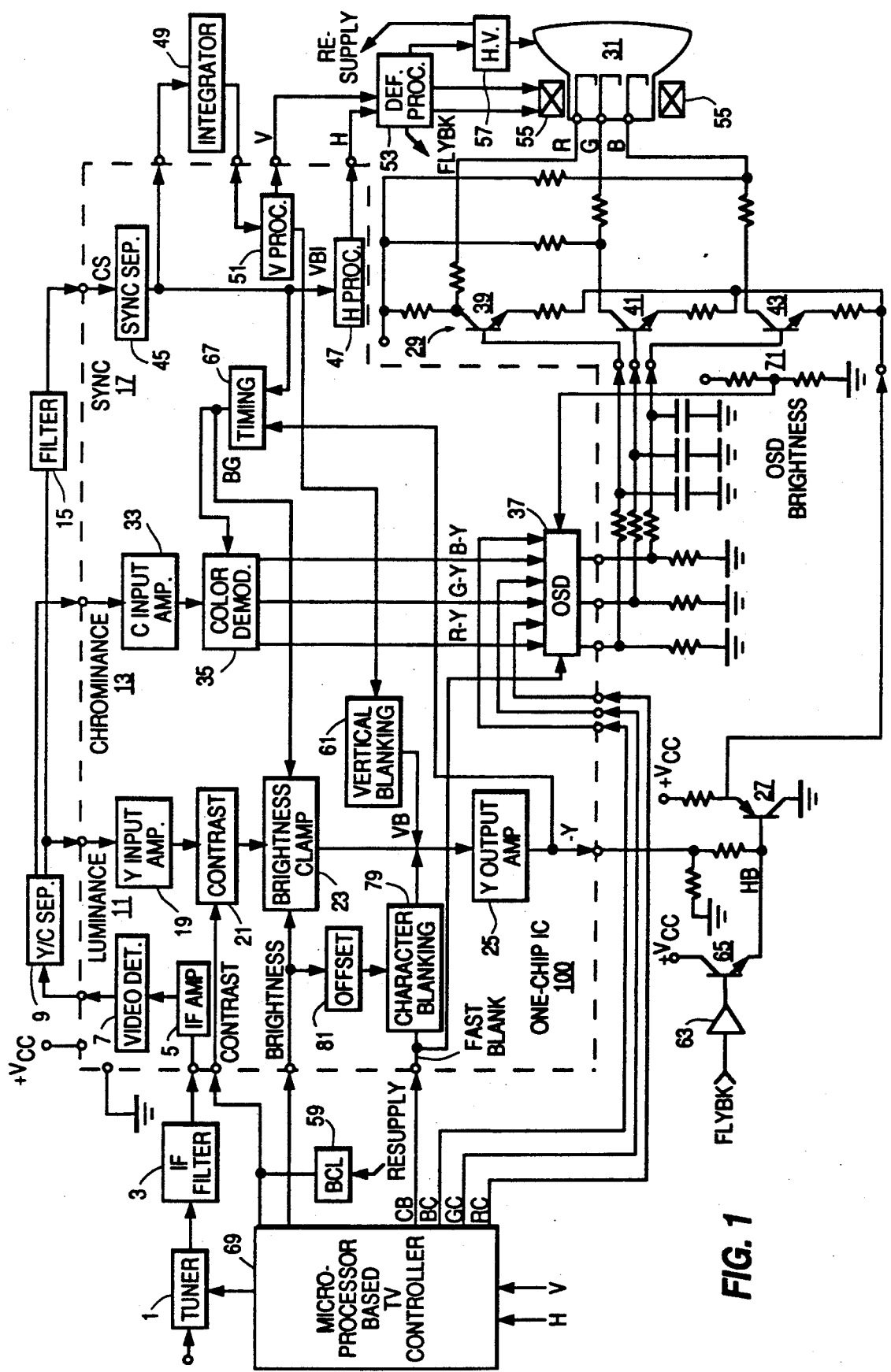
FIG. 1 is a block diagram of a portion of a television receiver including an OSD arrangement constructed in accordance with the invention.

Before describing the television receiver shown in FIG. 1 in detail, it is noted that a significant portion of the television receiver is incorporated within an integrated circuit IC 100 indicated by a dashed line. The terminals of IC 100 and terminals of other portions of the television receiver are indicated by circles. Integrated circuits such as IC 100 are commonly used in modern television receivers since they economically provide a large number of television signal processing functions and are therefore often referred to "one-chips".

The television receiver shown in FIG. 1 includes a tuner 1, IF filter 3, IF amplifier 5 and video detector 7 arranged to provide a composite video signal including luminance (Y), modulated chrominance (C) and a composite synchronization (CS) signal components. The luminance and chrominance signal components are separated by a Y/C separator 9, for example, including a comb filter, and are coupled to respective signal processing channels 11 and 13. The luminance signal component is also filtered by a filter 15 and the resultant signal is coupled to a synchronization signal processing channel 17. The television receiver also includes a sound channel (not shown) for demodulating and otherwise processing the sound component of the television signal received by tuner 1 to produce an audio signal.

Luminance channel 11 includes an input amplification section 19, a contrast control section 21, a brightness control section 23 and an output amplifier 25 for producing a processed luminance signal (−Y). Contrast control section 21 is response to a DC contrast control signal and brightness control section 23 is response to a DC brightness control signal to control respective image properties. The processed luminance signal (−Y) is coupled through an emitter-follower amplifier configured PNP transistor 27 to a video output or picture tube driver section 29 which provides the red (R), green (G) and blue (B) drive signals for a picture tube 31. Negative-going transitions of the processed luminance signal (−Y) coupled to picture tube driver section 29 correspond to white-going transitions of the image and positive-going transitions of the luminance signal correspond to black-going transitions of the image.

Chrominance channel 13 includes an input amplification section 33 and a color demodulator section 35 for producing red, green and blue color difference (R−Y, B−Y and G−Y) signals. The color difference signals are coupled through an on-screen display (OSD) network 37, the function of which will be explained below, to respective common emitter amplifier configured NPN transistors 39, 41 and 43 of picture tube driver section 29. Chrominance channel 13 also includes color saturation and tint control sections (not shown) associated with input amplifier 33 and color demodulator 35, respectively.

Synchronization channel 17 includes a synchronization ("sync") signal separator 45 which separates the composite synchronization (CS) signal form the luminance signal. The separated composite sync signal is coupled to a horizontal sync section 47 which provides horizontal sync pulses locked to the frequency and phase of the horizontal sync portions of the received television signal. The separated composite sync signal is also coupled to an integrator 49 which together with a vertical sync section 51 provides vertical sync pulses locked to the frequency and phase of the vertical sync portions of the received television signal. The horizontal and vertical sync pulses are coupled to a deflection signal processing section 53 which provides horizontal and vertical deflection signals for deflection coils 55 associated with picture tube 31.

A high voltage (HV) supply 57 coupled to deflection section 53 provides high operating voltage for picture tube 31. A so called "resupply" current drawn through high voltage supply 65 is indicative of the beam current drawn by picture tube 31. The HV resupply current is monitored by a by a beam current limiting (BCL) network 59 which is coupled to contrast control section 21. Beam current limiting network 59 causes the contrast to be reduced when the beam current as manifested by the HV resupply current exceeds a predetermined threshold to prevent so called "spot blooming" which defocuses the image and potential damage to picture tube 31.

Vertical sync section 51 also generates a vertical blanking interval (VBI) timing pulse. The vertical blanking interval timing pulse indicates the occurrence of the vertical blanking interval during which the electron beams of picture tube 31 are retraced from the bottom to the top of the screen of picture tube 31 at the end of each vertical (or field) scanning interval. The vertical blanking interval timing pulse is coupled to a vertical blanking network 61 of the luminance channel 11. Vertical blanking network 61 generates a vertical blanking (VB) pulse having a fixed blanking level of a sufficiently positive magnitude to ensure that NPN transistors 39, 41 and 43 of picture tube driver section 29 are "cutoff" during to the vertical blanking interval. The vertical blanking pulse is coupled to emitter-follower configured PNP transistor amplifier 27 which couples the processed luminance (−Y) signal to picture tube driver stage 29. As a result, picture tube 31 is "blanked" so that retrace scanning lines are not visible during the vertical retrace interval.

A horizontal blanking (HB) pulse also having a fixed blanking level sufficiently high to ensure that NPN transistors 39, 41 and 43 of picture tube driver section 29 are cutoff is generated by an amplifier 63 in response to the so called horizontal "flyback" pulse produced by deflection processing section 53. horizontal flyback pulse causes the electron beams of picture tube 31 to be retraced from the left to the right of the screen at the end of each horizontal line scanning interval. The horizontal blanking pulse is coupled to emitter-follower configured PNP transistor 27 by an emitter-follower configured PNP transistor 65 and causes picture tube 31 to be blanked during the horizontal retrace interval.

Synchronization channel 17 also includes a timing signal generator 67 which is responsive to synchronization pulses produced by sync separator 45 and and the luminance signal produced by luminance output amplifier 25 for generating timing signals for various signal processing sections. Details of timing signal generator 67 will be described with reference to FIG. 2.

One of the timing signals generated by timing generator 67 is a "burst gate" (BG) pulse and identifies the occurrence of an interval known as the "back porch" following each horizontal synchronization pulse of the composite video signal and which contains a "color burst" signal. The color burst signal has a number of cycles of a signal having the the same frequency and phase as the chrominance information carrier and is used by color demodulator 35 to demodulate the chrominance information. The burst gate pulse is coupled to color demodulator 35 where it is used to extract the color burst from the chrominance signal.

The burst gate pulse is also coupled to brightness control section 23 of luminance channel 11. The level of the back porch portion of the luminance signal corresponds to the black level of the reproduced image. Brightness control section 23 of luminance channel 11 controls the magnitude of the back porch or black level of the luminance signal to to control the brightness of the reproduced image. More specifically, as will be described in detail with respect to FIG. 5, brightness control section 23 includes a so called "keyed clamp" which is gated "on" in response to the burst gate pulse to clamp the black level of the luminance signal to the the brightness control signal.

A microprocessor-based control unit 69 which generates control signals for various portions of the television receiver such as for tuner 1, contrast control section 21 and brightness control section 23 and others not specifically shown. It also generates on-screen display (OSD) signals for displaying characters and/or graphics on the screen of picture tube 31 to indicate status information for certain functions, such as the channel number of the selected channel and the volume, contrast, brightness, color saturation and tint levels, and to provide operating instructions for controlling these functions. Specifically, control unit 69 generates one or more of red, green and blue character (RC, GC and BC) character signals and a character blanking (CB) signal. The character signals cause the characters and graphics to be displayed while the character blanking signal causes the video image "behind" the character and graphics to be blanked, as will be explained below in greater detail. The character and character blanking signals include pulses which are synchronized with vertical (V) and horizontal (H) rate signals coupled to control unit 69 from deflection section 53 and which determine the vertical and horizontal positions of the characters and graphics on the screen of picture tube 31. Control unit 69 may comprise a type ST6497 integrated circuit available from SGS-Thomson.

The OSD character signals are coupled to OSD network 37 where they are amplified. The character blanking signal is also coupled to OSD network 37 through a so called "fast blanking" input of "one-chip" IC 100 and causes the amplified OSD character signals to be substituted for respective ones of the color difference signals produced by color demodulator 37. Therefore, the amplified OSD character signals replace the color difference signals coupled to NPN transistors 39, 41 and 43 of picture tube driver stage 39. As a result, an image in which characters and/or graphics have been inserted. The brightness of the OSD characters and graphics is controlled by a DC OSD brightness control voltage provided by a voltage divider 71 and coupled to OSD network 37.

The receiver described so far is conventional and may employ a type M52041SP one-chip television IC presently available from Mitsubishi Electric Corporation. This one-chip IC is arranged in a manner similar to that of IC 100, with the exception of the ultra-black character blanking level provisions which will be discussed below and which are the subject of the present invention.

As earlier noted, it is desirable to suppress ("blank") the video image at the locations ("behind") the OSD characters and graphics so as to make them more visible with respect to the surrounding video image. This may be accomplished by causing blanking pulses having a sufficiently high positive blanking level the same or substantially the same as that of the retrace blanking pulses to be generated and coupled to picture tube driver stage 29 in response to the character blanking pulses. For this purpose, the character blanking (CB) signal may be coupled to an amplifier which in turn has an output coupled to PNP emitter-follower configured transistor 27. To avoid the use of an additional amplifier, the character blanking signal may be coupled to an amplifier which is already used for retrace blanking. For example, with respect to the television receiver shown in FIG. 1, the character blanking signal may be coupled to amplifier 63 used for horizontal retrace blanking. It is also possible to perform OSD character blanking within "one-chip" IC 100 by causing blanking pulses having the same or substantially the same high positive level as the retrace blanking pulses to be generated by an internal amplifier and coupled to luminance channel 11 in response to the character blanking pulses.

However, coupling character blanking pulses having the same or substantially the same high positive level as the retrace blanking pulses to luminance signal processing channel 11 of "one-chip" television IC 100 may cause unwanted pulses which occur during the active or image portions of the scanning intervals to be coupled to timing signal generator 67. Such unwanted pulses may adversely affect the operation of the receiver and produce visible noise spikes and other unwanted artifacts. This is particularly a problem when the amount of OSD characters and graphics is significant, which is often the case in modern television receivers.

Figure 2:
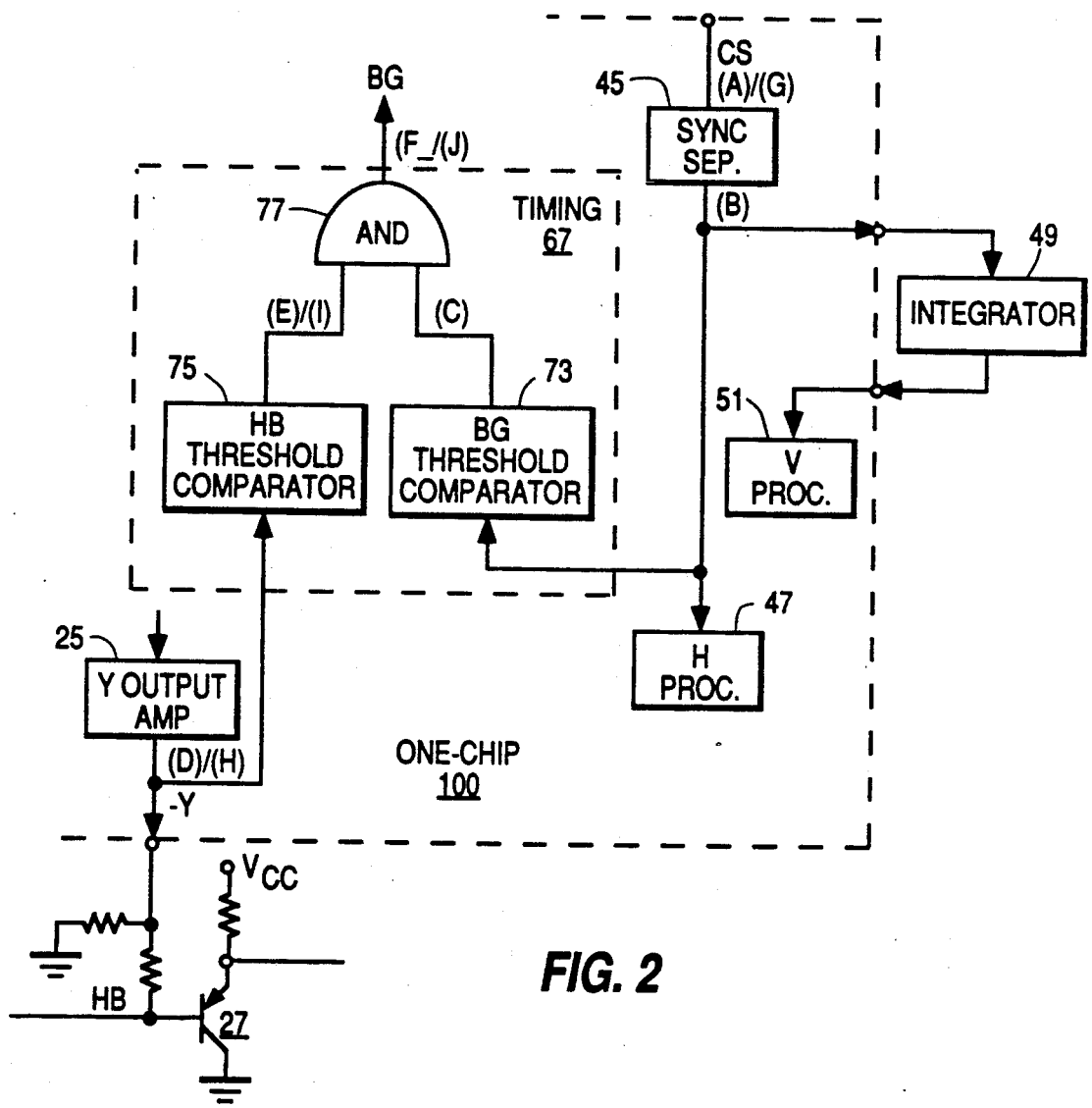
FIG. 2 is a block diagram of a portion of the television receiver shown in FIG. 1 in greater detail and helpful in facilitating an understanding of a problem solved by the invention.
Figure 3:
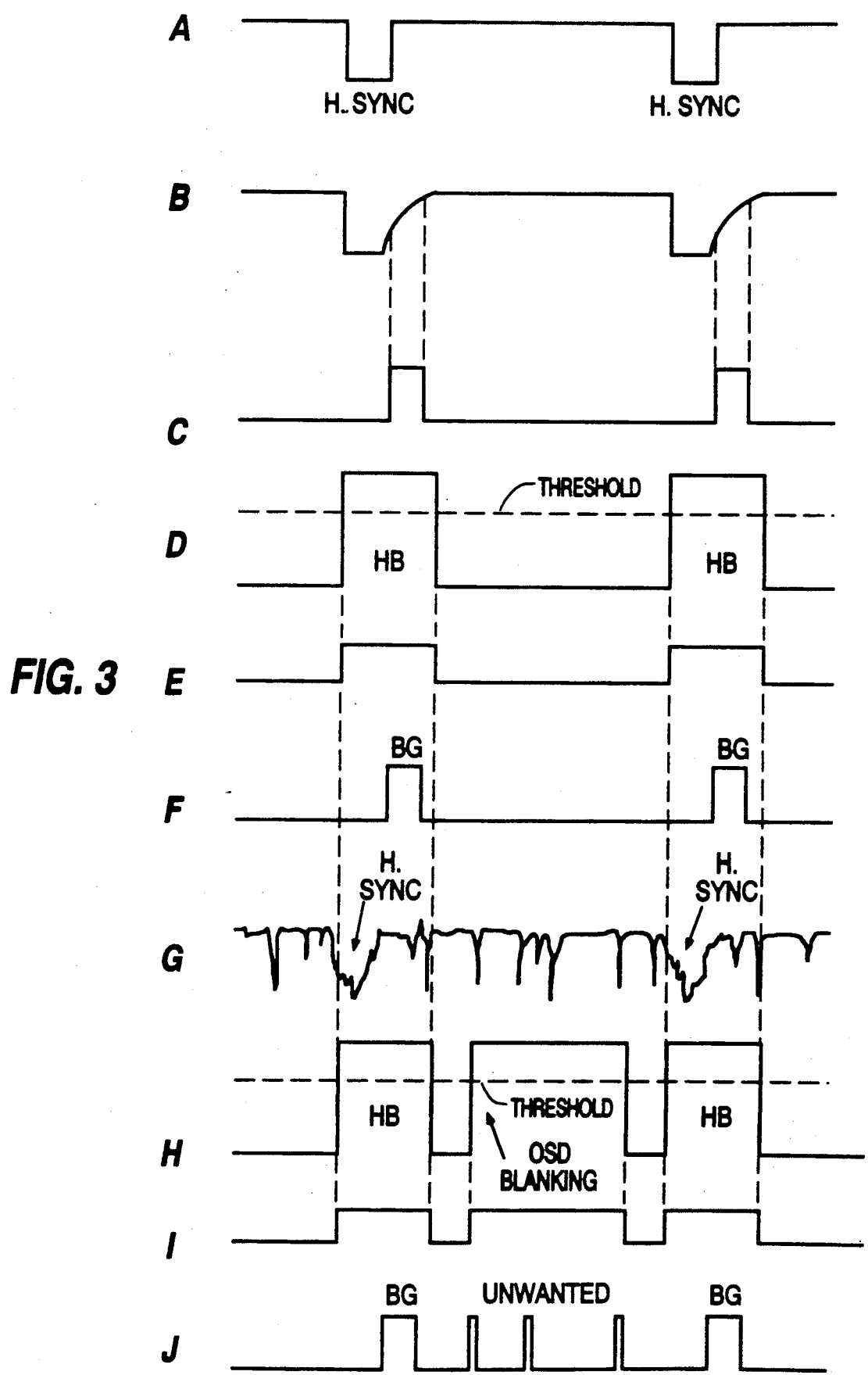
FIGS. 3(a–f) is a graphical representation of waveforms helpful in understanding the operation of the arrangement shown in FIG. 2.

This problem is more specifically described with reference to the block diagram of timing signal generator 67 shown in FIG. 2 and and the waveforms which illustrate the operation of timing signal generator 61 shown in FIG. 3. Timing signal generator 67 includes a threshold comparator 73 which generates a pulse (waveform C) corresponding in time to the occurrence of the color burst in response an integrated version (waveform B) of the horizontal sync signal (waveform A) produced at the output of sync separator 45. The integration of the horizontal sync signal is due integrator 49 which includes a shunt connected capacitor (not shown) at its input. Another threshold comparator 75 generates a pulse (waveform E) corresponding in time to the horizontal blanking interval from the horizontal blanking (HB) pulse (waveform D) coupled to emitter-follower configured PNP transistor 27 at the luminance signal output of one-chip IC 100. An "and" function circuit 77 generates the burst gate (BG) pulse (waveform F) in response to the coincidence of the "high" levels of the pulses (waveforms C and E) produced by threshold comparators 73 and 75. "And" function circuit 77 is intended to guard against erroneous burst gate pulses being generated during the line scanning interval in response to noise by preventing a burst gate pulse from being generated except during the time interval, the horizontal blanking interval, in which it is supposed to occur.

Waveform H illustrates the input signal of threshold comparator 75 and waveform I illustrates its output signal if high level character blanking pulses where to be coupled to the base of PNP transistor 27 together with the horizontal blanking (HB) pulses. Waveform G illustrates the composite sync signal when the RF signal received by tuner 1 is weak. The negative-going noise pulses of the composite sync signal which occur during the line scanning interval between horizontal sync pulses result in the generation of corresponding positive-going noise pulses at the output of threshold comparator 73 and therefore at the input of "and" function circuit 77. The latter positive-going noise pulses would be enabled to be coupled to the output of "and" function circuit 77 during the image interval in response to the pulses of waveform I produced by threshold comparator 75 if high level character blanking pulses were to be coupled to PNP transistor 27. As a result, erroneous burst gate pulses would be generated, as is indicated by waveform J. Such pulses can causes visible color transitions and otherwise interfere with the proper operation of the television receiver.

Figure 4A:
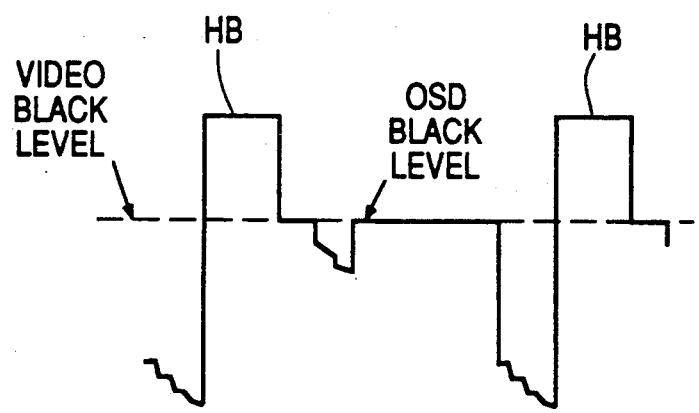
FIGS. 4a and 4b are graphical representations of waveforms helpful in understanding the operation of the OSD arrangement shown in FIG. 1.

The problem just described above may be avoided if the level of the high level character blanking pulses is kept below the threshold of horizontal blanking comparator 75. Clamping the character blanking pulses to the brightness (black level) control signal which is coupled to brightness control section 23 accomplishes this result while still permitting the video image behind the OSD characters and graphics to be adequately blanked at a nominal brightness setting. The waveform shown in FIG. 4a illustrates the output luminance signal (−Y) coupled to picture tube driver 29 resulting from such an arrangement.

However, it has been found that the character blanking level may not be sufficient to adequately blank the video image behind the OSD characters and graphics, thereby reducing their visibility, when the character blanking level is clamped directly to the brightness level under certain operating conditions. For example, when the brightness is set at or near its maximum level the character blanking level may reduced to the point at which the video image is not completely blanked behind the characters and graphics causing their visibility to be reduced. This situation may be aggravated if if brightness control section 79 comprises keyed clamp, such as discussed with reference to FIG. 5, having a storage capacitor which fails to adequately maintain the black level control signal to which is has been set. To avoid such a problem, it is preferable that the character blanking level be set to an "ultra-black" level which tracks, but is slightly greater than the black level (higher in the illustrated embodiment) than the black level. Accordingly, as shown in FIG. 1, a character blanking network 79, included within luminance channel 11 of one-chip 100, is coupled to the brightness (black level) control input through an offset voltage device 81 and is responsive to pulses of the character blanking (CB) signal for causing the luminance signal to be clamped to the brightness (black) level plus an offset. The offset causes the character blanking level to be sufficiently high to ensure that the video image behind characters and graphics is blanked, but sufficiently lower than the retrace blanking level so that erroneous blanking pulses will not be generated by threshold comparator 75 (FIG. 2) of timing signal generator 61. As a result, of the "ultra-black" OSD character blanking arrangement shown in FIG. 1, the output luminance signal (−Y) coupled to picture tub driver 29 has the waveform illustrated in FIG. 4b.

Figure 5:
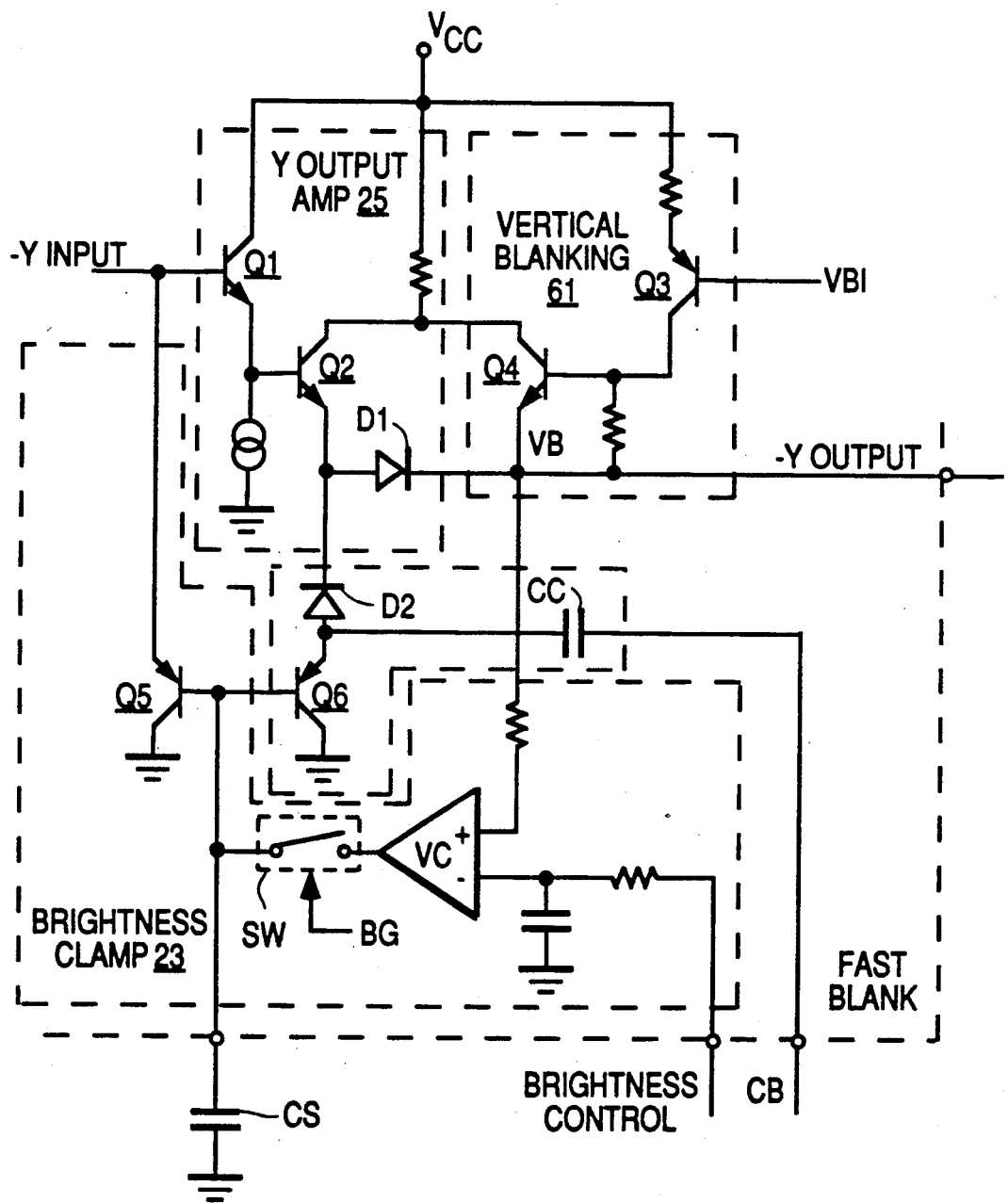
FIG. 5 is a schematic diagram of a circuit implementation of a portion of the OSD arrangement shown in block form in FIG. 1.

A circuit implementation of the character blanking arrangement in cooperation with other sections of one-chip 100 is shown in FIG. 5.

Luminance output amplifier 25 comprises two cascaded emitter-follower configured PNP transistors Q1 and Q2 and a diode D1. The output luminance signal is developed at the cathode of diode D1. Vertical blanking section 63 comprises a common emitter configured PNP transistor Q3 and an emitter-follower configured NPN transistor Q4. The vertical blanking interval (VBI) timing pulse is coupled to the base of PNP transistor Q3 and the vertical blanking (VB) pulse is developed at the emitter of NPN transistor Q4. The emitter of NPN transistor Q4 is coupled to the output of the luminance channel 11 at the cathode of diode D1.

Brightness control section 23 comprises a so-called "keyed feedback clamp" including a voltage comparator VC and a electronic switch SW. The output luminance signal (−Y) developed at the cathode of diode D1 is coupled to one input (+) of voltage comparator VC and the brightness control voltage (BC) is coupled to the other input (−). Switch SW is normally non-conductive (opened) and is only rendered conductive (closed) during in response to the burst gate (BG) pulse. When switch SW is closed, the voltage difference between the black level of the output luminance (−Y) signal and the brightness (black) control signal is stored in an external storage capacitor CS. The stored voltage is coupled to the input of output luminance amplifier 25 at the base of transistor Q1 through an emitter-follower configured PNP transistor Q5 and thereafter to the output of the luminance channel by cascaded emitter-follower configured transistors Q1 and Q2. As a result of the operation of the keyed clamp, the black level of the output luminance (−Y) signal is:

$$BC + 0.6 \text{ V (Q5)} - 0.6 \text{ V (Q1)} - 0.6 \text{ V (Q2)} - 0.6 \text{ V (D1)}$$

The ultra-black character blanking arrangement includes a emitter-follower configured NPN transistor Q6, a diode D2 and a coupling capacitor CC. The voltages at the base of transistors Q2 and Q6 are each substantially equal to the voltage stored in capacitor CS because the voltage drop between the base and emitter of transistor Q5 is substantially equal to but opposite in polarity to the voltage drop between the base and emitter of transistor Q1. Therefore, transistor Q6 and diode D2 are normally non-conductive. Transistor Q6 and diode D2 are rendered conductive and transistor Q2, which is normally conductive, is rendered non-conductive when a positive-going character blanking (CB) pulse is applied to the fast blanking input of one-chip 100. As a result of this operation, the character blanking level is:

$$BC + 0.6 \text{ V (Q6)} - 0.6 \text{ V (D2)} - 0.6 \text{ V (D1)}$$

Figure 4B:
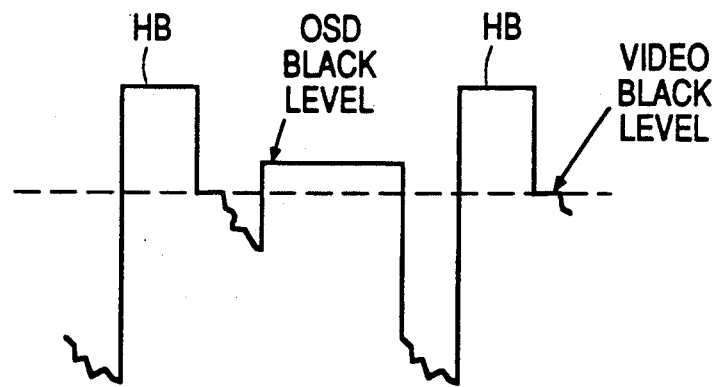

Thus, the character blanking level is 0.6 volts greater than the black level, as is illustrated by the waveform of the output luminance signal shown in FIG. 4b.

In the implementation shown in FIG. 5, the function of character blanking switch 79 (FIG. 1) is provided because of the arrangement of coupling capacitor CC, transistor Q6 and diode D2, and the function of offset device 81 is provided because of the different number of semiconductor junctions in the two paths (one for black level clamping and another for character blanking) between storage capacitor CS and the cathode of diode D1.

It will be appreciated that while the invention has been described with reference to an OSD arrangement utilizing all of the red, green and blue character signals, it is equally applicable to an OSD arrangement utilizing less than three character signals. In addition, while a specific implementation of the character blanking arrangement was described by way of example, others may become apparent to those skilled in the art. Further, while the purpose of the character blanking pulses of the described embodiment is to blank behind the characters and/or graphics, it will be appreciated that the invention is equally applicable to character pulses intended to blank the video image adjacent to characters, as well as behind characters, in order to provide a character "edging" effect. These and other modifications are contemplated to be within the scope of the invention defined by the following claims.

I claim:

1. In a television system, apparatus comprising:
    a source of an input video signal representing an image to be displayed and including a black level contained in periodic synchronization intervals separating image intervals;
    brightness control means responsive to said input video signal and to a brightness control signal and keyed in response to keying pulses for providing at an output an output video signal including a black level dependent on said brightness control signal;
    timing means for deriving said keying pulses in response to image blanking pulses occurring during respective ones of said synchronization intervals;
    means for coupling said image blanking pulses to said timing means through said output whereby said output video signal is also coupled to timing means;
    a source of an auxiliary signal representing characters or graphics to be displayed by a display device and an associated character blanking pulses indicating when said video signal is to be blanked and when said characters or graphics are to be displayed; and
    character control means responsive to said character blanking pulses and said brightness control signal for causing said output video signal to assume a character blanking level which is dependent on said brightness control signal, which is offset from said black level of said output video signal and which has an amplitude between said black level and the level of said image blanking pulses coupled to said timing means and at which said timing means is inhibited from responding to said character blanking pulses.

2. The television system recited in claim 1, wherein: said character control includes a semiconductor device for establishing said offset.

3. The television system recited in claim 1, wherein: said brightness control means includes capacitance means for storing a voltage representative of the difference between said black level of said output video signal and said brightness control signal; and means for combining said stored voltage and said input video signal to produce said output video signal.

4. The television system recited in claim 2, wherein: said character control means includes a semiconductor device for establishing said offset coupled between said capacitance means and said output and which is rendered conductive in response to said character blanking pulses.

5. The television system recited in claim 4, wherein: said image blanking pulses are horizontal blanking pulses.

6. In a television system, apparatus comprising:
a source of an input video signal representing an image to be displayed and including image intervals separated by synchronization intervals including respective synchronization pulses and a black level;
brightness control means responsive to said input video signal and to a brightness control signal for providing at an output an output video signal including a black level during said synchronization intervals dependent on said brightness control signal;
said brightness control means including means rendered operative in response to keying pulses for causing capacitance means to store a voltage representative of the difference between said black level of said output video signal and said brightness control signal; and means for combining said stored voltage and said input video signal to produce said output video signal;
image blanking means for deriving image blanking pulses in response to said synchronization pulses;
timing means for deriving said keying pulses signal in response to said image blanking pulses;
means for coupling said image blanking pulses to said timing means through said output whereby said output video signal is also coupled to said timing means;
a source of an auxiliary signal representing characters or graphics to be displayed by a display device and an associated character blanking pulses indicating when said video signal is to be blanked and when said characters or graphics are to be displayed; and
character control means including a semiconductor device rendered operative in response to said character blanking pulses and coupled between said capacitance means and said output for causing said output video signal to assume a character blanking level which is dependent on said brightness control signal, which is offset from said black level of said output video signal and which has an amplitude between said black level and the level of said image blanking pulses coupled to said timing means and at which said timing means is inhibited from responding to said character blanking pulses.

* * * * *